(12) United States Patent
Nakamura

(10) Patent No.: US 8,358,080 B2
(45) Date of Patent: Jan. 22, 2013

(54) LIGHT EMITTING ELEMENT DRIVING CIRCUIT

(75) Inventor: Hiroyuki Nakamura, Atsugi (JP)

(73) Assignee: Canon Kabushiki Kaisha, Tokyo (JP)

( * ) Notice: Subject to any disclaimer, the term of this patent is extended or adjusted under 35 U.S.C. 154(b) by 192 days.

(21) Appl. No.: 13/005,979

(22) Filed: Jan. 13, 2011

(65) Prior Publication Data

US 2011/0187277 A1 Aug. 4, 2011

(30) Foreign Application Priority Data

Jan. 29, 2010 (JP) ................................. 2010-019463
Jan. 29, 2010 (JP) ................................. 2010-019466

(51) Int. Cl.
*H05B 37/00* (2006.01)
(52) U.S. Cl. ...................... 315/209 R; 315/291; 315/307
(58) Field of Classification Search .................. 315/291, 315/209 R, 223, 219, 224, 225, 307, 308
See application file for complete search history.

(56) References Cited

U.S. PATENT DOCUMENTS

| 5,796,767 A | 8/1998 | Aizawa | 372/38 |
| 7,915,883 B2 * | 3/2011 | Chida | 323/315 |
| 7,932,679 B2 * | 4/2011 | Ball | 315/247 |
| 7,952,295 B2 * | 5/2011 | Otake et al. | 315/224 |
| 7,977,891 B2 * | 7/2011 | Shiu et al. | 315/291 |

FOREIGN PATENT DOCUMENTS

| JP | 05-152662 | 6/1993 |
| JP | 09-232635 | 9/1997 |

* cited by examiner

*Primary Examiner* — David H Vu
(74) *Attorney, Agent, or Firm* — Fitzpatrick, Cella, Harper & Scinto

(57) ABSTRACT

A light emitting element driving circuit for driving a light emitting element in accordance with a differential data signal for causing the light emitting element to turn on or turn off is provided. The circuit includes a first transistor, a first constant current source connected to a drain and gate of the first transistor and configured to supply a constant current through the drain and source of the first transistor, a second transistor configured to supply a certain current, and a control circuit configured to electrically connect or disconnect the gate of the first transistor to or from a gate of the second transistor via a first resistor. The control circuit may supply, to the gate of the second transistor, an intermediate potential in accordance with the other of the differential data signals, while the gate of the first transistor is electrically disconnected from the gate of the second transistor.

12 Claims, 10 Drawing Sheets

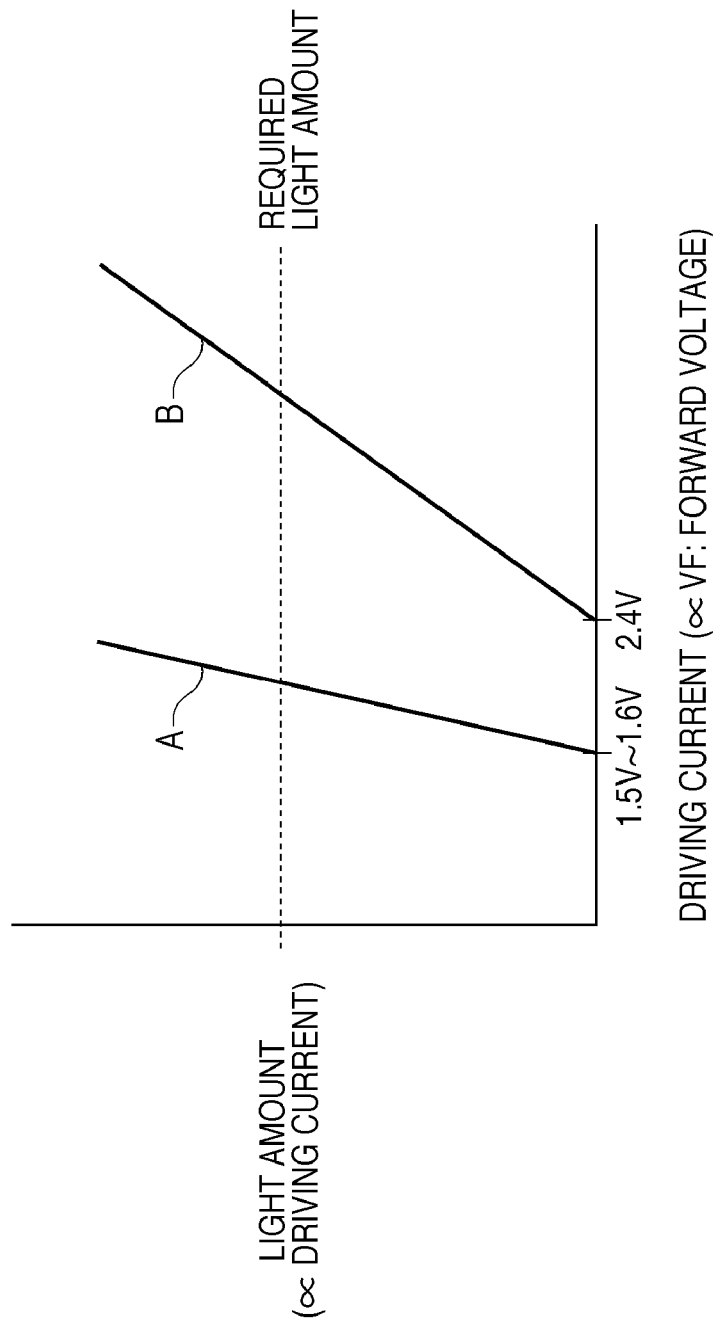

LIGHT EMITTING ELEMENT DRIVING CIRCUIT

BACKGROUND OF THE INVENTION

1. Field of the Invention

The present invention relates to a light emitting element driving circuit and, more particularly, to a light emitting element driving circuit for driving a light emitting element in a CMOS semiconductor integrated circuit used for image forming in a copy machine, laser beam printer (to be referred to as an LBP hereinafter), or the like which is required to operate with a low voltage, low driving current, and low cost.

2. Description of the Related Art

Conventionally, driving circuits for semiconductor light emitting elements have been devised to increase the pulse widths of output light signals from the semiconductor light emitting elements compared to the driving current pulse width. For example, the technique disclosed in Japanese Patent Laid-Open No. 05-152662 uses two stages of differential circuits and provides a level shift circuit between them. In addition, Japanese Patent Laid-Open No. 09-232635 discloses cascode-connected current mirror circuits. That is, a plurality of stages of current mirror circuits is provided to switch cascode connections.

FIG. 10 shows the current-to-light conversion characteristics between general driving currents and emitted light amounts in a semiconductor laser diode (to be abbreviated as LD hereinafter) as a semiconductor light emitting element. Referring to FIG. 10, a line A indicates the characteristic of the LD at fresh condition, and a line B indicates the characteristic of the LD when it has degraded due to use over time. As the LD degrades, the forward voltage of the LD which is required to obtain the same light amount increases. The forward voltage that causes the LD to start emitting light is about 1.5 to 1.6 V at fresh condition, but gradually increases to about 2.4 V as the LD degrades. In a copy machine or LBP, in order to guarantee a given number of copies, the driving circuit is required to control the desired light amount and pulse width even in a state in which the LD has degraded. In addition, with recent improvement in the performance of LDs, the light emission threshold has become several mA, which allows to obtain a desired light amount with a lower current than the past LDs.

According to the prior art described above, however, in the degraded state of the LD, since the power supply voltage required includes an operation voltage for serially connected two MOS transistors as well as a forward voltage for the LD, a 5-V system power supply is required. Therefore, a system using a 3-V power supply for a control system and a 12-V or 24-V power supply for a power system, which is a general arrangement for a recent copy machine or LBP, additionally requires a 5-V system power supply for LD driving. This leads to an increase in system cost. Furthermore, when the semiconductor integrated circuit outputs constant current pulses to the outside to drive the LD with high-speed constant current pulses, the pulses may be influenced by parasitic inductance in bonding wires, the lead frame of the package, or the like. This causes overshoot, undershoot, and ringing in the waveform of a constant current supplied to the LD, resulting in degradation of the LD. In addition, since an LD is a current-driven device, in order to obtain a predetermined light amount, it is necessary to drive the device with a constant current. As is the case with an LD forward voltage, the light emission threshold gradually increases as the LD degrades. From the viewpoint of guaranteeing a given number of copies, therefore, it is necessary to drive the LD with a constant current up to several ten mA as in the prior art. That is, it is necessary to design a MOS transistor for supplying a constant current to the LD into a size that can supply a sufficient maximum driving current. This makes it necessary to drive "the MOS transistor designed with a necessary size" with a small current in a low-current region, as described above, resulting in a degradation in the responsivity of the driving circuit. Since a parasitic capacitance including the gate capacitance of "MOS transistor designed with a necessary size" is charged, the rising time increases, resulting in a failure to obtain a desired optical pulse width. When using a cathode common LD, it is necessary to use a PMOS which is inferior in current supplying ability or current driving ability to an NMOS.

SUMMARY OF THE INVENTION

According to one aspect of the present invention, in consideration of the problems in the prior art, there is provided a light emitting element driving circuit which improves the control accuracy of the pulse width of light emitted by an LD based on a data signal, allows low-voltage operation, and suppresses overshoot and undershoot in an output current.

According to an aspect of the present invention, a light emitting element driving circuit for driving a light emitting element in accordance with a differential data signal for causing the light emitting element to turn on or turn off, comprising: a first transistor; a first constant current source connected to a drain and gate of the first transistor and configured to supply a constant current through the drain and source of the first transistor; a second transistor configured to supply a current relative to the constant current to the light emitting element; and a control circuit configured to electrically connect or disconnect the gate of the first transistor to or from a gate of the second transistor via a first resistor in accordance with one of the differential data signals, wherein the control circuit includes a potential supply unit configured to supply, to the gate of the second transistor, an intermediate potential between a potential that completely turns on the second transistor and a potential that completely turns off the second transistor in accordance with the other of the differential data signals, while the gate of the first transistor is electrically disconnected from the gate of the second transistor.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention, and together with the description, serve to explain the principles of the invention.

FIG. 10 is a graph showing the characteristics of a laser diode.

DESCRIPTION OF THE EMBODIMENTS

Light emitting element driving circuits according to the embodiments of the present invention will be described below in detail.

First Embodiment

Figure 1:
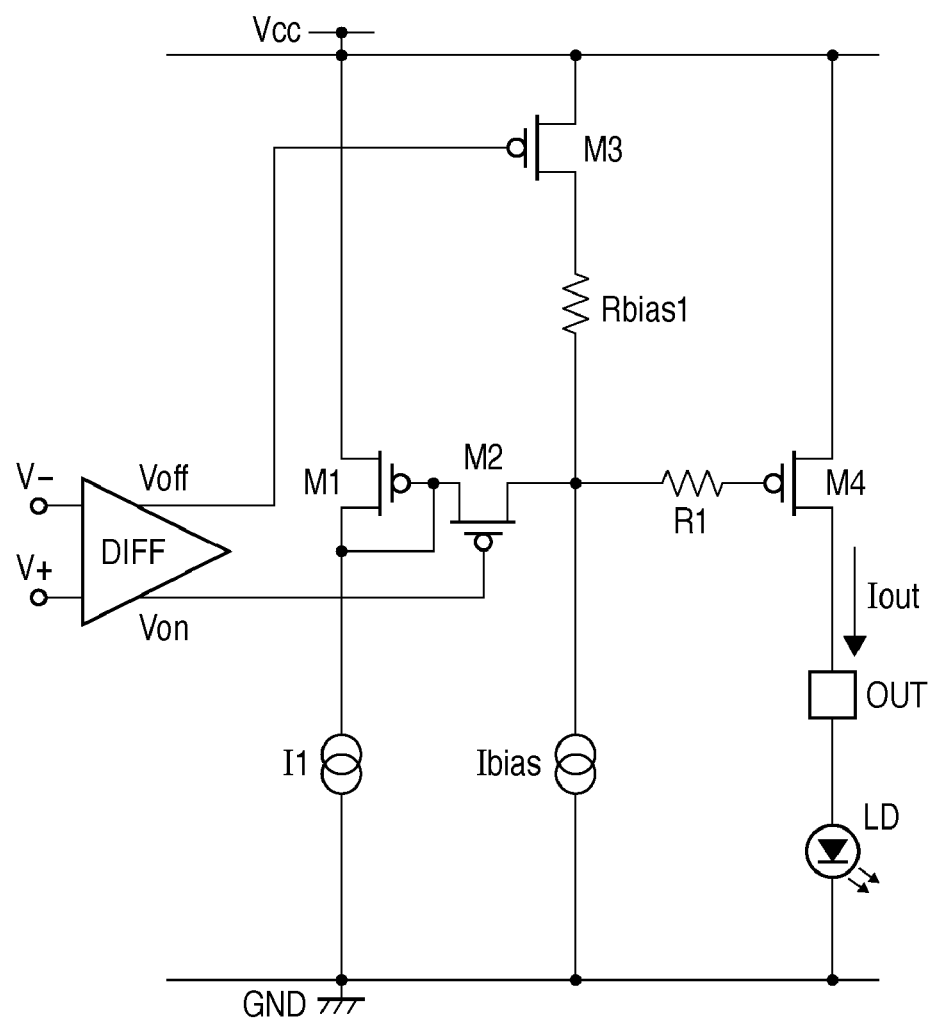
FIG. 1 is a circuit diagram showing an example of a circuit arrangement according to the first embodiment of the present invention.

An example of a circuit arrangement according to the first embodiment will be described with reference to FIG. 1. Referring to FIG. 1, MOS transistors M1 and M4 constitute a current mirror circuit having a predetermined mirror ratio. The gate and drain of the MOS transistor M1 are connected to one terminal of a constant current source I1 whose other terminal is connected to GND (ground). The source of the MOS transistor M1 is connected to a power supply potential Vcc. The drain of a MOS transistor M2 is connected to both the gate and drain of the MOS transistor M1. The source of the MOS transistor M2 is connected to one terminal of a resistor R1 whose other terminal is connected to the gate of the MOS transistor M4. The source of the MOS transistor M2 is connected to one terminal of a resistor Rbias1 whose other terminal is connected to the drain of a MOS transistor M3. The source of the MOS transistor M2 is connected to one terminal of a constant current source Ibias whose other terminal is connected to GND (ground). That is, the resistor Rbias1 and the constant current source Ibias are connected in series. The gate of the MOS transistor M2 is connected to an output Von of a differential output signal generating circuit DIFF, which is one of the differential data signals. The gate of the MOS transistor M3 is connected to an output Voff of the differential output signal generating circuit DIFF, which is the other of the differential data signals. The MOS transistor M4 has a size m (m is an integer) times the size of the MOS transistor M1. The drain of the MOS transistor M4 is connected to one terminal of a semiconductor light emitting element LD, whose other terminal is connected to GND, to supply a current of m×I1 to the semiconductor light emitting element LD. Note that the back gates of the MOS transistors M1 to M4 are connected to their sources to make the MOS transistors M1 to M4 operate as self-bias MOS transistors. The arrangement including the MOS transistors M2 and M3, the resistor Rbias1, and the constant current source Ibias in FIG. 1 will be referred to as a control circuit.

An example of circuit operation in the first embodiment will be described next. Reference symbols V− and V+ denote complementary digital signal inputs to the differential output signal generating circuit DIFF. When V−>V+, since Von=Low, gate potential of MOS transistor M2=Low, and Voff=High. Therefore, gate potential of MOS transistor M3=High. As a result, the MOS transistor M2 is turned off, and hence the current mirror circuit constituted by the MOS transistors M1 and M4 becomes inactive state. On the other hand, since the MOS transistor M3 is turned on, a current from the constant current source Ibias flows through a resistor Rbias to supply a potential to the gate of the MOS transistor M4. If, however, the MOS transistor M4 is designed to set source-gate voltage Vgs4 to be equal to (Rbias×Ibias) (which is less than the threshold voltage of MOS transistor M4), the LD is turned off. That is, the potential supplied to the gate of the MOS transistor M4 is an intermediate potential between the potential that completely turns on the MOS transistor M4 and the potential that completely turns off the MOS transistor M4. It is desirable to set this intermediate potential to a value closer to the potential that completely turns on the MOS transistor M4 than the potential that completely turns off the MOS transistor M4. When V−<V+, since Von=High, gate potential of MOS transistor M2=High, and Voff=Low. Therefore, gate potential of MOS transistor M3=Low. As a result, the MOS transistor M2 in the ON state connects the gates of the MOS transistors M1 and M4 to each other. This activates the current mirror circuit constituted by the MOS transistors M1 and M4 to cause the MOS transistor M4 to generate a current m times the current from the constant current source I1 and cause the LD to turn on, that is, to emit light.

Assume that the operation state of the LD to turn on/turn off at high speed is controlled based on a data signal. In order to obtain a desired current value and pulse width, the MOS transistor M4 is designed so that the gate potential can quickly reach a desired potential. Assume, for example, a circuit which does not include the resistor Rbias and the constant current source Ibias. In this case, the time taken for the gate potential of the MOS transistor M4 to reach a desired potential depends on the magnitude of a current from the constant current source I1, and is equal to the time required for the constant current source I1 to charge the gate capacitance of the MOS transistor M4 to the desired potential. This prolongs the time taken to charge the gate capacitance of the MOS transistor M4 in a low-current region, and hence prolongs the time taken for the gate potential of the MOS transistor M4 to reach the desired potential. This delays the time at which the LD starts emitting light and shortens the light emission period of the LD, resulting in a failure to obtain accurate image data. In FIG. 1, the source-gate voltage Vgs4 of the MOS transistor M4 is kept at a pre-bias potential (Rbias×Ibias) even while the MOS transistor M4 is OFF and the LD is turned off. This can shorten the time taken to turn on the MOS transistor M4. As a result, the rising time of an output drain current Iout of the MOS transistor M4 can be shortened.

Figure 2:
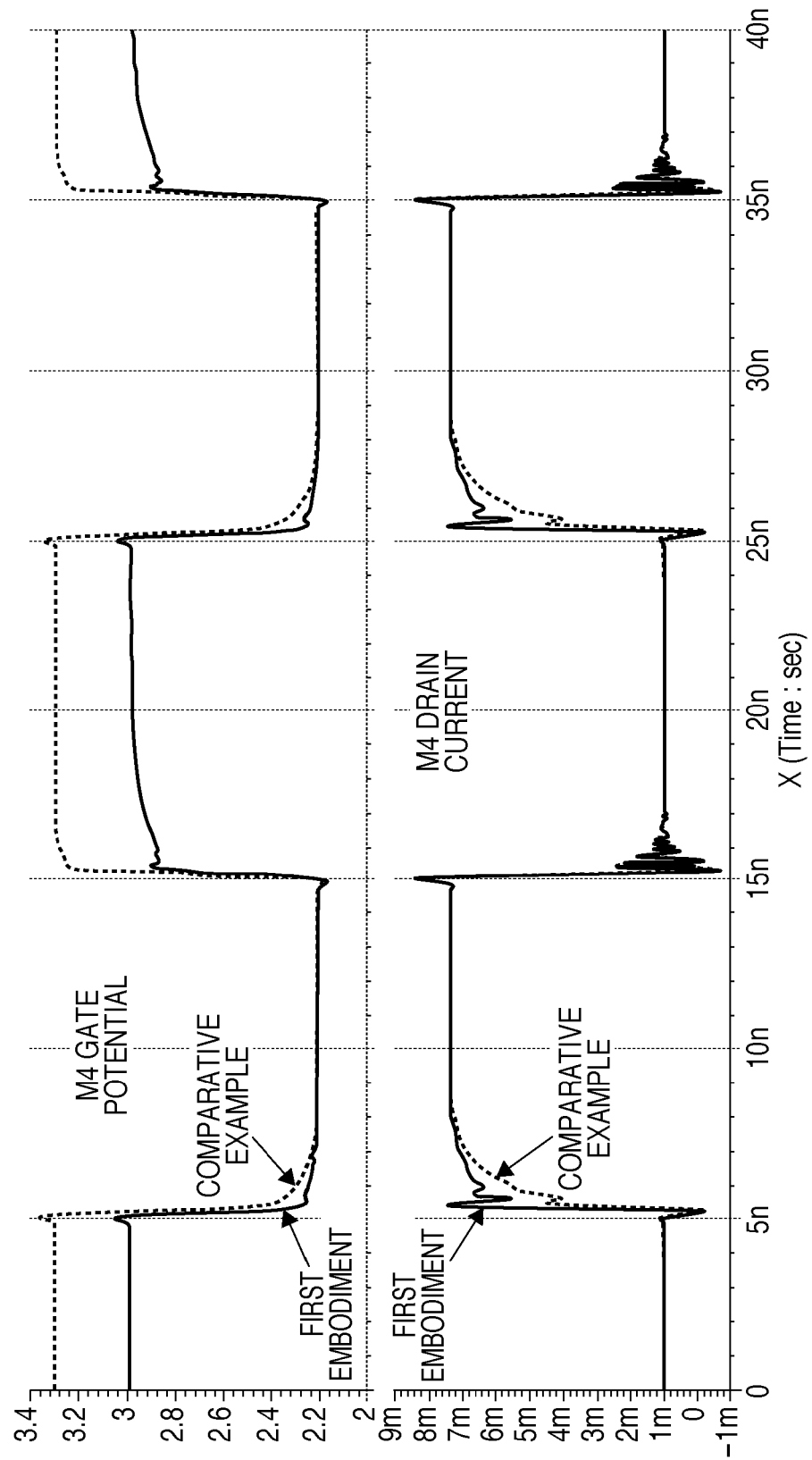
FIG. 2 is a graph showing the waveforms of simulation results according to the first embodiment of the present invention.

The waveforms and benefits of the circuit according to the first embodiment will be described with reference to FIG. 2. FIG. 2 shows the simulation waveforms obtained when resistor Rbias=1.5 kΩ and pre-bias of source-gate voltage Vgs4 of MOS transistor M4=0.3 V. Using the circuit according to this embodiment shortens the rising time by about 0.6 ns as compared with comparative examples in which no pre-bias is provided. For example, since the pulse width of 200-Mbps data is 5 ns, the shortened rising time means an improvement in pulse width accuracy by more than 10%.

Second Embodiment

Figure 3:
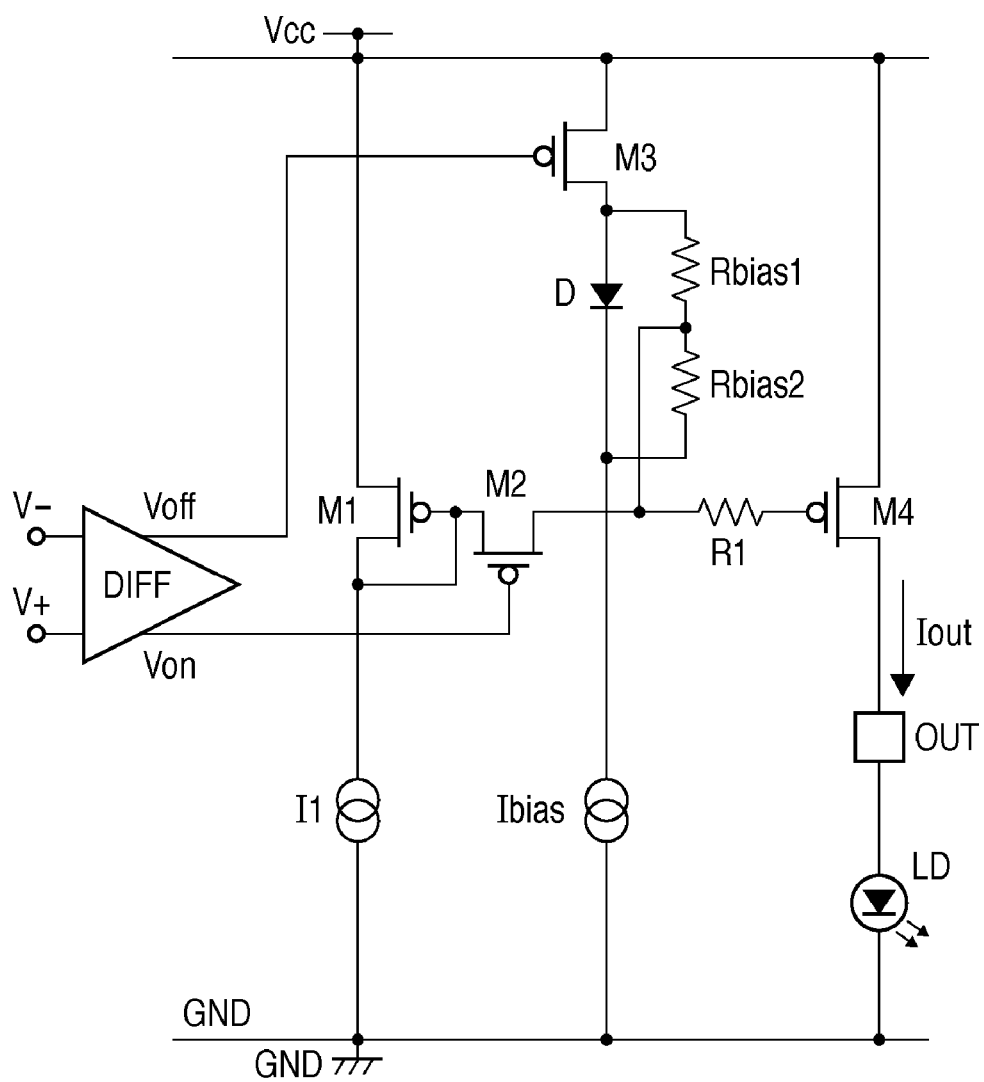
FIG. 3 is a circuit diagram showing an example of a circuit arrangement according to the second embodiment of the present invention.

An example of a circuit arrangement according to the second embodiment will be described with reference to FIG. 3. In FIG. 3, a potential to be supplied to the gate of a MOS transistor M4 is obtained by use of the following resistance circuit. This resistance circuit is formed by connecting a diode D in parallel with two serially connected resistors Rbias1 and Rbias2. The two resistors Rbias1 and Rbias2 divide the forward voltage for the diode D, which is generated by a constant current source Ibias, to obtain a potential to be supplied to the gate of a MOS transistor M4 from the connection point between the two resistors Rbias1 and Rbias2. Since other arrangements are the same as those in the first embodiment, a repetitive description of them will be omitted. In the second embodiment, the pre-bias voltage at the connection point between the two resistors Rbias1 and Rbias2 is given by Vbias=VF×{Rbias2/(Rbias1+Rbias2)}, where VF represents the forward voltage of the diode. In the simulation of the second embodiment, Rbias1=1 kΩ and Rbias2=2 kΩ, and the combined resistance value of them, that is 3 kΩ, is set to be higher than resistance value Rbias=1.5 kΩ in the first embodiment. This setting is made to prevent the output MOS transistor M4 from generating a current at an off state due to, for example, variations in threshold in Ibias, Rbias, and PMOS, when the circuit arrangement of the first embodiment is implemented by a semiconductor integrated circuit (to be referred to as an IC hereinafter). For this reason, in the first embodiment, the pre-bias voltage is set to be considerably lower than the threshold voltage for the PMOS. In the second embodiment, a forward voltage for the diode with low current dependence is made by using resistance voltage division to cancel variations in resistance. By such arrangement, the pre-bias voltage is set closer to the threshold value, resulting in a higher speeding-up effect.

This can be explained from the following equation to determine the diode forward voltage VF:

$$VF = (KT/g) \times \ln(Ibias/Is)$$

This equation indicates that even when the current doubles, the forward voltage changes by only 18 mV. In addition, Vbias=VF×{(Rbias2)/(Rbias1+Rbias2)} holds. This equation indicates that the relationship between the denominator and the numerator cancels variations in resistance. Possible variations in Ibias in an actual IC are about ±30%, and a change in Vbias is small due to the resistance voltage division effect. It is therefore possible to ignore fluctuations in output current Iout. Applying a pre-bias to the gate electrode of the MOS transistor M4 by using the diode in this manner can provide a pre-bias closer to the threshold without exceeding the threshold due to variations.

Figure 4:
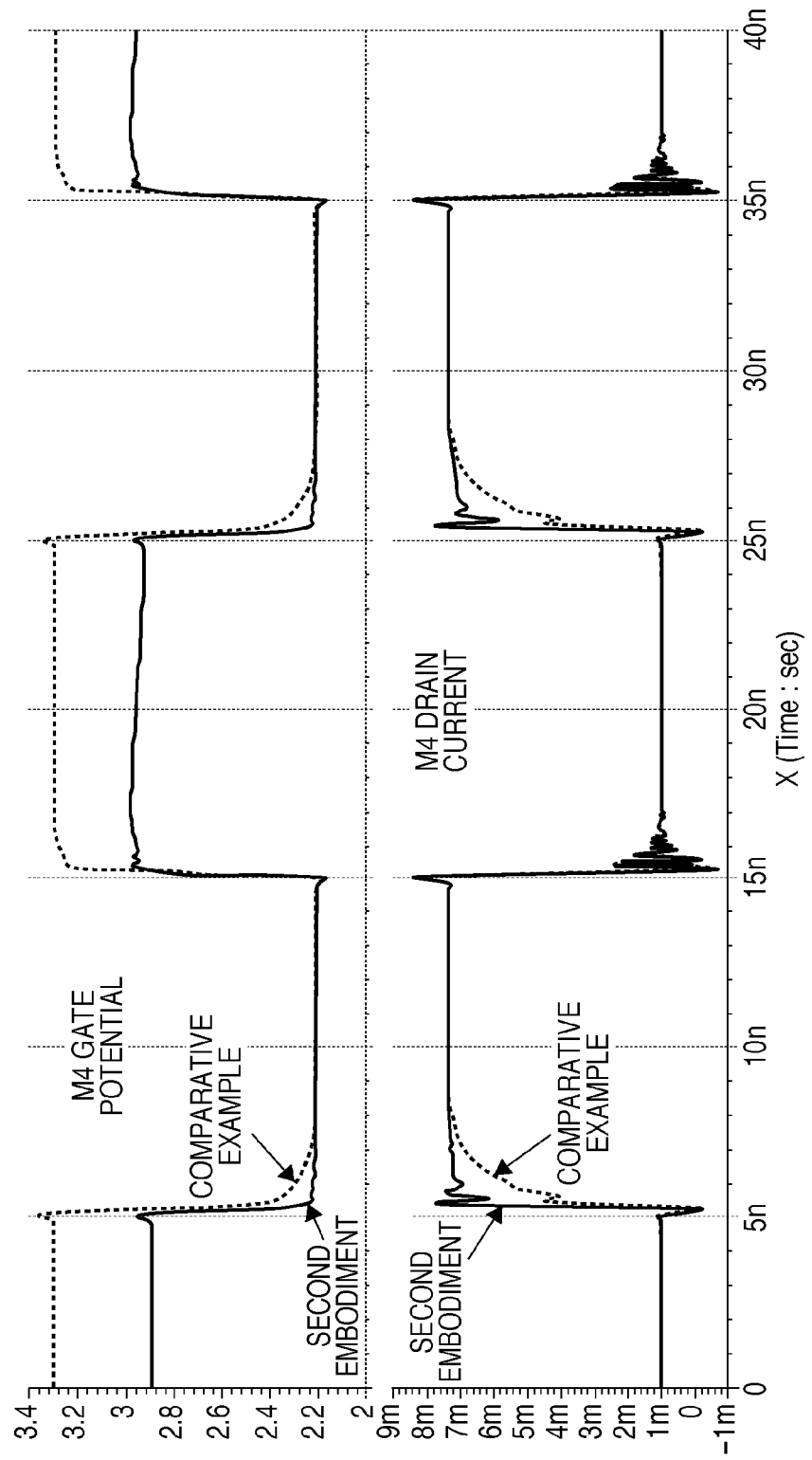
FIG. 4 is a graph showing the waveforms of simulation results according to the second embodiment of the present invention.

Waveforms and benefits in the circuit according to the second embodiment will be described with reference to FIG. 4. FIG. 4 shows the simulation waveforms in the second embodiment. The rising time of the output drain current Iout from the MOS transistor M4 shortens as compared with the comparative example.

Third Embodiment

Figure 5:
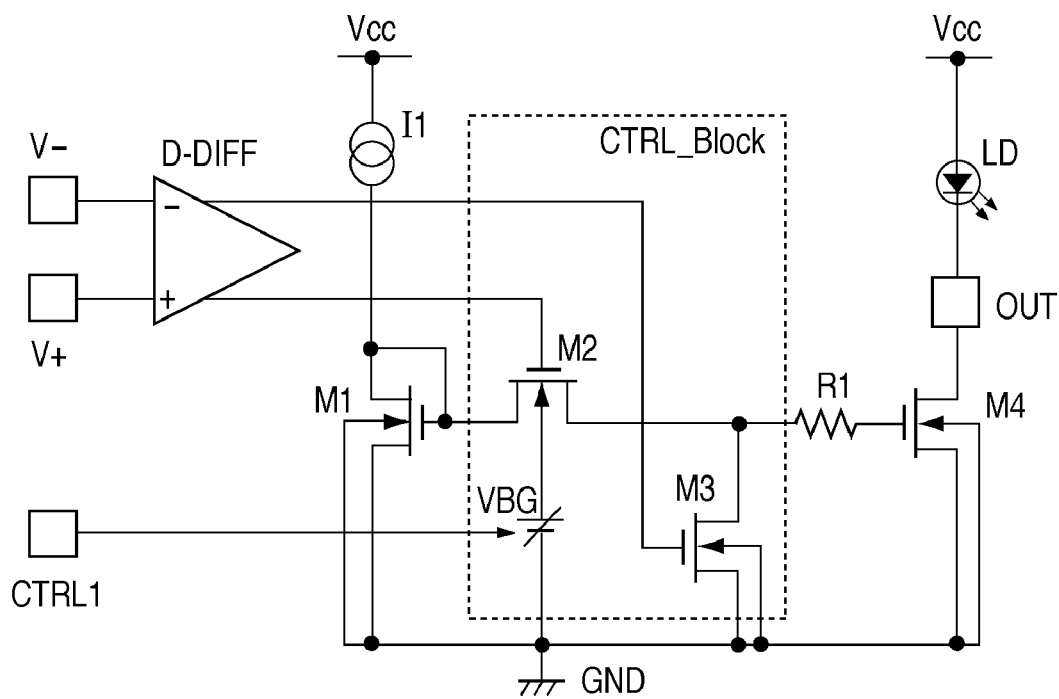
FIG. 5 is a circuit diagram showing an example of a circuit arrangement according to the third embodiment of the present invention.

An example of a light emitting element driving circuit according to the third embodiment will be described with reference to FIG. 5. In FIG. 5, an LD is a light emitting element having current-current-to-light conversion characteristics. MOS transistors M1 and M4 constitute a current mirror circuit to operate this LD in accordance with differential data signals in a digital form.

The gate and drain of the MOS transistor M1 are connected to one terminal of a constant current source I1 whose other terminal is connected to a power supply Vcc. The source of the MOS transistor M1 is connected to GND (ground potential). MOS transistors M2 and M3 constitute a control block CTR BLOCK (control circuit) to ON/OFF-control the LD. The drain of the MOS transistor M2 is connected to both the gate and drain of the MOS transistor M1. The source of the MOS transistor M2 is connected to one terminal of a resistor R1 whose other terminal is connected to the gate of the MOS transistor M4, and to the drain of the MOS transistor M3. In addition, the gate of the MOS transistor M2 is connected to one of the differential data signal outputs of a differential digital signal generating circuit D-DIFF. The back gate of the MOS transistor M2 is connected to one terminal of a variable voltage source VBG whose other terminal is connected to GND. A control signal externally input to a terminal CTRL1 controls the voltage of the variable voltage source VBG. The source of the MOS transistor M3 is connected to GND. The gate of the MOS transistor M3 is connected to the other of the differential data signal outputs of the differential digital signal generating circuit D-DIFF. The back gates of the MOS transistors except for the MOS transistor M2 are connected to GND. The MOS transistor M4 has a size m (m is an integer) times that of the MOS transistor M1. The drain of the MOS transistor M4 is connected to one terminal (OUT in FIG. 5) of the semiconductor light emitting element LD whose other terminal is connected to a power supply and supplies a current of (m×I1) to the LD.

In FIG. 5, reference symbols V− and V+ denote complementary digital signal inputs. When V−>V+, since gate potential of MOS transistor M2=Low, that is, the MOS transistor M2 is turned off, gate potential of MOS transistor M3=High, that is, the MOS transistor M3 is turned on. As a result, gate potential of MOS transistor M4 is nearly equal to GND, that is, the MOS transistor M4 is turned off, and hence the LD is turned off. When V−<V+, since gate potential of MOS transistor M2=High, that is, the MOS transistor M2 is turned on, gate potential of MOS transistor M3=Low, that is, the MOS transistor M3 is turned off. As a result, the MOS transistor M2 connects the gates of the MOS transistors M1 and M4 to each other. This sets the current mirror circuit constituted by the MOS transistors M1 and M4 in an active state. The MOS transistor M4 is then turned on to generate a current m times a current from the constant current source I1. As a result, the LD emits light.

Assume that the operation state of the LD is controlled based on data signals to turn on/turn off at high speed. In order to obtain a desired current value and pulse width, the MOS transistor M4 is designed so that the gate potential can quickly reach a desired potential. The rising time of the gate potential of the MOS transistor M4 depends on the magnitude of a current from the constant current source I1, and is equal to the time required for the constant current source I1 to charge the gate capacitance of the MOS transistor M4 to the desired potential. This prolongs the time taken to charge the gate capacitance of the MOS transistor M4 in a low-current region, and hence prolongs the rising time of the gate potential of the MOS transistor M4. As a result, the light emission time of the LD shortens, resulting in a failure to obtain accurate image data. In FIG. 5, since the back gate of the MOS transistor M2, which is an NMOS, is set at a reference voltage VBG in advance, it is possible to shorten the time taken to turn on the MOS transistor M2. This makes it possible to shorten the rising time of the MOS transistor M4.

Figure 6:
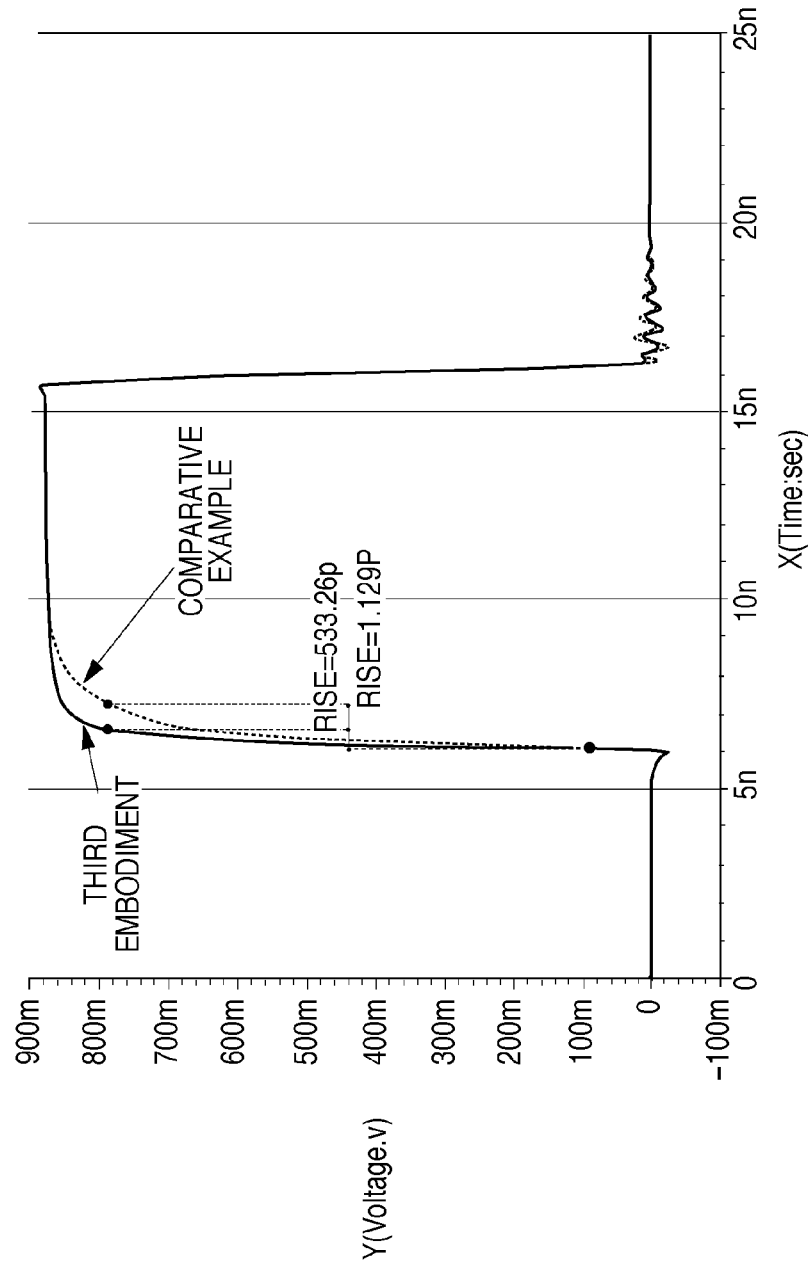
FIG. 6 is a graph showing the waveforms of simulation results according to the third embodiment of the present invention.

FIG. 6 shows the waveform of the gate potential of the MOS transistor M4 when voltage VBG=0.4 V in FIG. 5. This shows that the rising time shortens by about 0.6 ns as compared with a case in which no VBG is provided (comparative example). For example, since the pulse width at a data rate of 200 Mbps is 5 ns, this shortened rising time means an improvement in pulse width accuracy by more than 10%.

According to the third embodiment, since the power supply voltage required includes only a forward voltage for the LD and a voltage for the driving MOS transistor to supply a constant current to the LD, it is possible to achieve a reduction in power supply voltage. In addition, this embodiment is configured to control the potential at the back gate of the MOS transistor to turn on the driving MOS transistor. This makes it possible to control a threshold voltage and hence to optimally set the responsivity of the driving circuit even in a low-current region.

Fourth Embodiment

Figure 7:
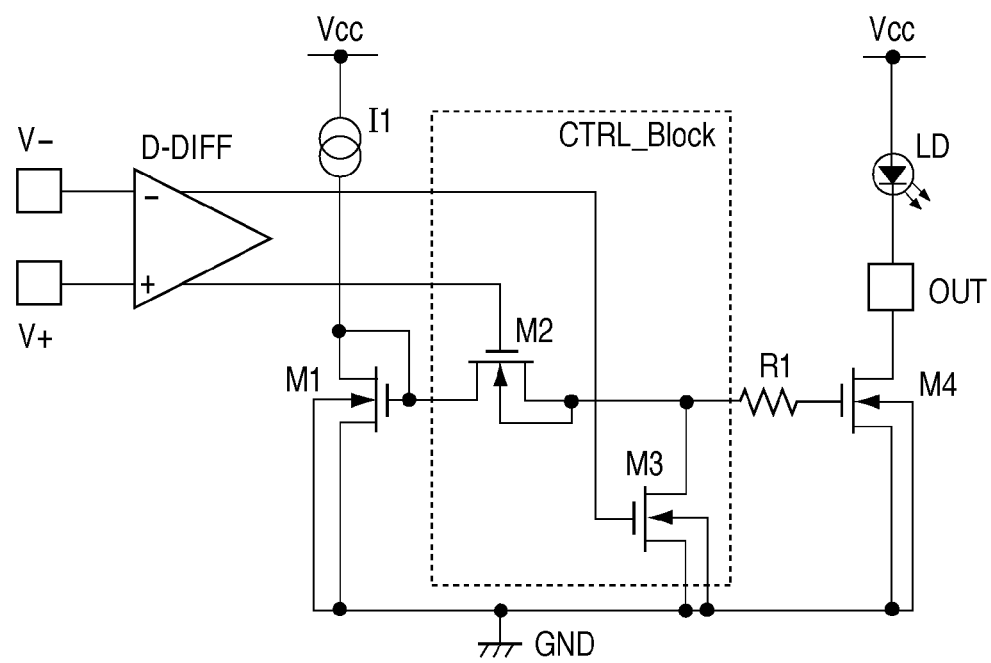
FIG. 7 is a circuit diagram showing an example of a circuit arrangement according to the fourth embodiment of the present invention.

An example of a circuit arrangement according to the fourth embodiment will be described below with reference to FIG. 7. In the fourth embodiment, a MOS transistor M2 is a self-bias connected transistor, with its back gate and source being connected (short-circuited). Inserting the gate capacitance of the MOS transistor M2 between the gate and the source allows to transmit a pulse applied to the gate electrode to the gate electrode of a MOS transistor M4 via the gate capacitance. This can further shorten the rising time and further improve the data width accuracy. In this case, however, overshoot may sometimes occur. For this reason, a resistor is inserted in the gate of the MOS transistor M4 and the source of the MOS transistor M2 to form an LPF (Low Pass Filter) using the gate capacitance of the MOS transistor M4 and the resistor, thereby suppressing overshoot.

Figure 8:
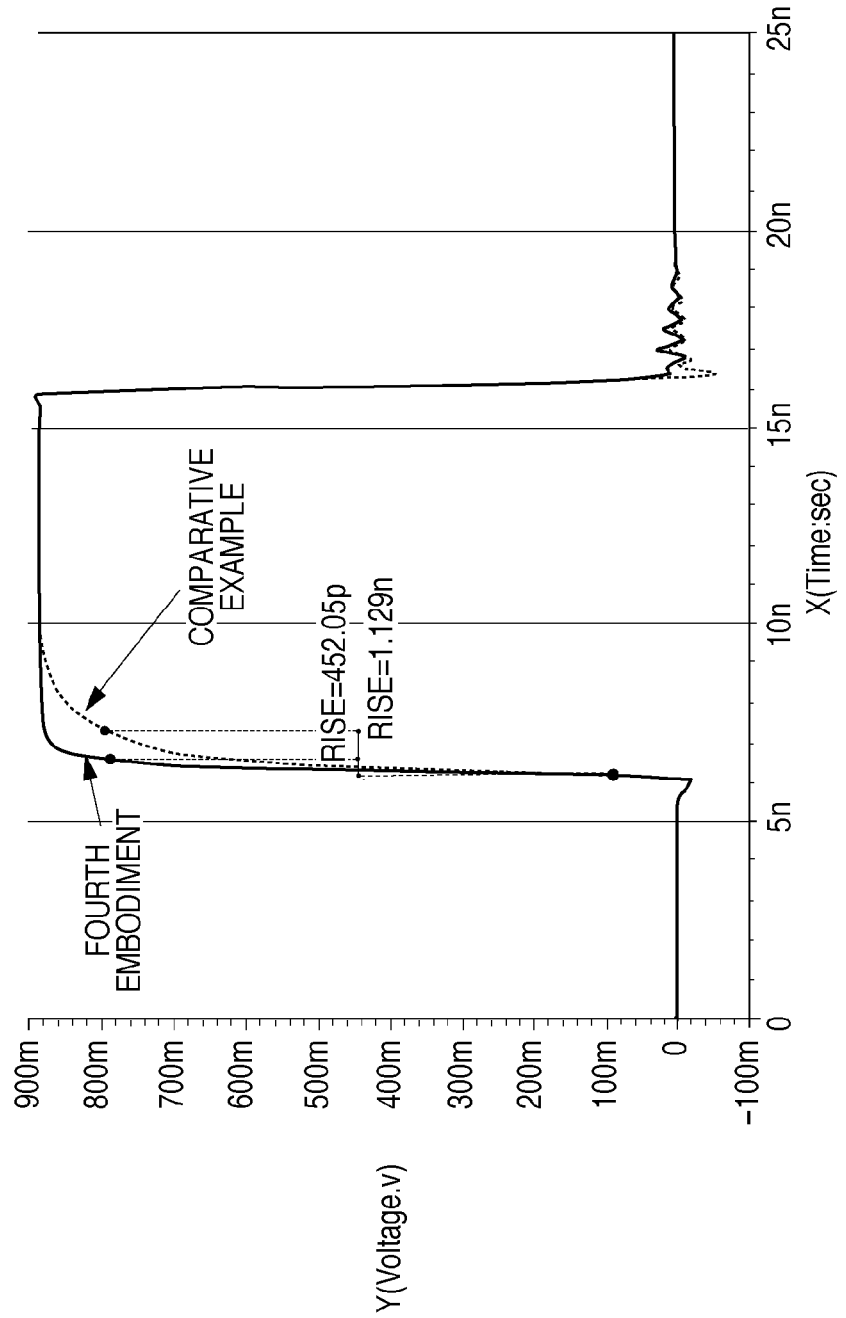
FIG. 8 is a graph showing the waveforms of simulation results according to the fourth embodiment of the present invention.

FIG. 8 shows the waveform of the gate potential of the MOS transistor M4 in the fourth embodiment. FIG. 8 indicates that the rising time improves by about 0.68 ns. For example, since the pulse width at a data rate of 200 Mbps is 5 ns, the shortened rise time means an improvement in pulse width accuracy by more than 13% as compared with the prior art.

According to the fourth embodiment, since the power supply voltage required includes only a forward voltage for the LD and a voltage for the driving MOS transistor to supply a constant current to the LD, it is possible to achieve a reduction in power supply voltage. In addition, the fourth embodiment has an effect that it controls the potential at the back gate of the MOS transistor to turn on the driving MOS transistor, and hence can optimally set the responsivity of the driving circuit even in a low-current region. Furthermore, in the fourth embodiment, connecting the back gate to the source can connect the gate and the source via the gate capacitance. This makes it possible to speed up the rising of the gate potential of the driving MOS transistor by using the rising of a driving pulse.

Other Embodiments

The first and second embodiments have exemplified the circuits to drive the cathode common laser diodes. However, the same benefits can also be achieved with anode common laser diodes. In such arrangement, a PMOS is replaced by an NMOS. The third and fourth embodiments have exemplified the anode common laser diodes. However, the same benefits can also be achieved with cathode common laser diodes. In such arrangement, an NMOS is replaced by a PMOS.

Figure 9:
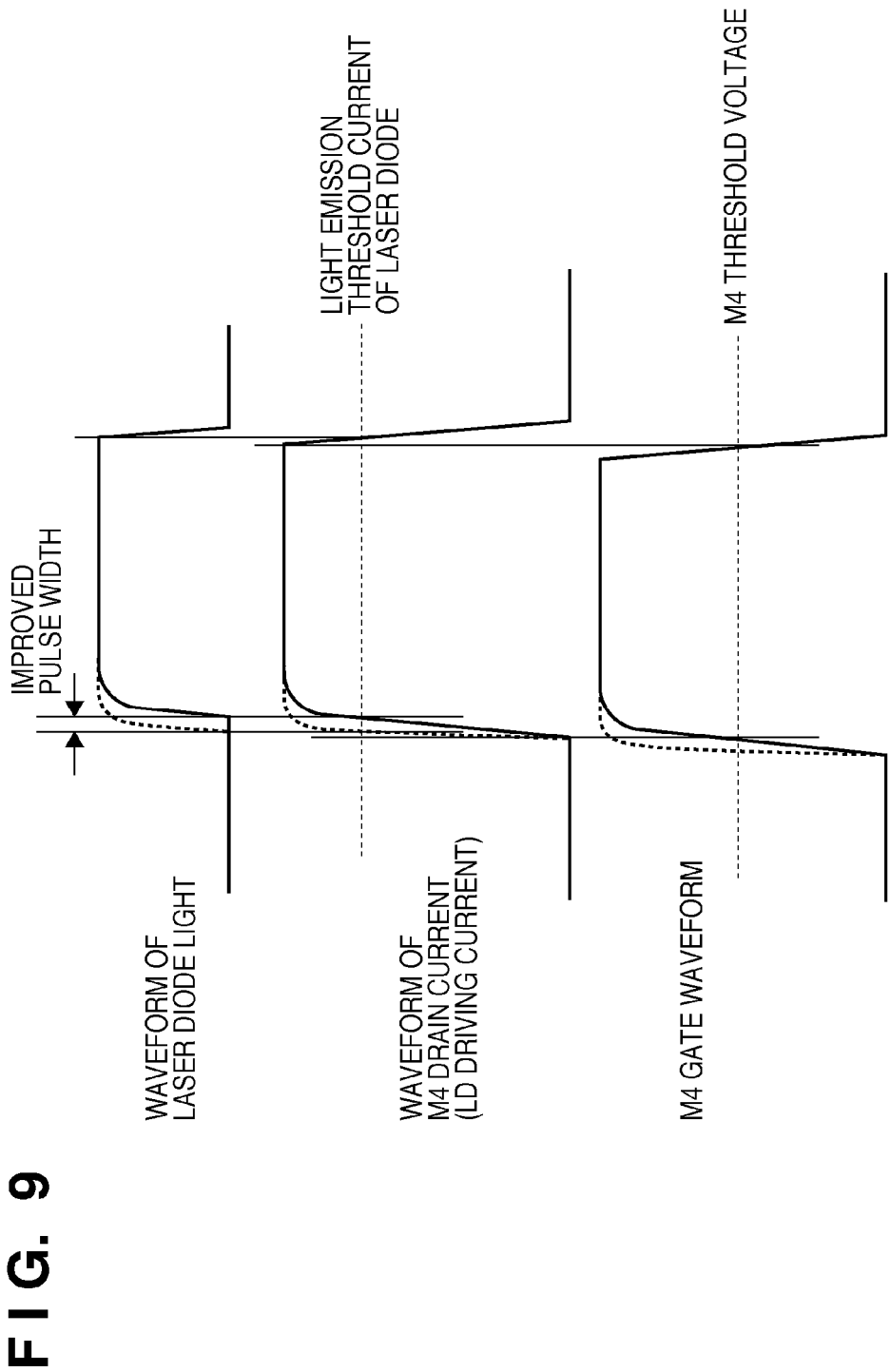
FIG. 9 is a view schematically showing the result of each embodiment of the present invention.

FIG. 9 is a diagram for explaining how improving the rising time in the first to fourth embodiments will improve the light emission pulse width accuracy of the LD. FIG. 9 schematically shows the gate potential waveform in the MOS transistor M4, the drain current waveform in the MOS transistor M4, and the light emission waveform in the LD. First of all, since the MOS transistor has a threshold, when the gate potential exceeds the threshold, a drain current starts to flow through the MOS transistor M4. In addition, since the LD also has a light emission threshold current, when a drain current from the MOS transistor M4, which is a driving current for the LD, exceeds the light emission threshold current, the LD emits light. For this reason, the time taken to reach each threshold will decrease the required light emission pulse width, resulting in degradation in accuracy.

The dotted lines in FIG. 9 show a case in which the rising time of the gate potential of the MOS transistor M4 is improved. The light emission pulse width of the above light emitting element which is determined by the time during which the MOS transistor M4 is ON is increased by shortening the rising time of the gate potential of the MOS transistor M4. That is, the light emission pulse width of the LD becomes closer to the width of a pulse applied to the gate of the MOS transistor M4. This improves the pulse width accuracy.

As has been described above, each embodiment of the present invention can provide a constant current circuit to drive a laser diode using a 3-V system power supply in an LBP, copy machine, or the like which outputs an image by using the laser diode. This contributes to a reduction in the cost of the system and an improvement in performance.

For example, since the power supply voltage required includes only a forward voltage for the LD and a voltage for the driving MOS transistor to supply a constant current to the LD, it is possible to achieve a reduction in power supply voltage. This reduction in power supply voltage can reduce the system cost required for the power supply. In addition, the drain electrode of the MOS transistor which turns off the driving MOS transistor is connected to the constant current source (constant current value I) via the resistor (resistance value R). For this reason, the source-gate voltage Vgs of the driving MOS transistor is not set to 0 but is fixed to the potential determined by Vgs=I×R (pre-bias). This potential is set to a voltage equal to or less than the threshold voltage of the driving MOS transistor. This prevents a driving current from being output unless an ON signal is applied to the gate of the driving MOS transistor. When an ON signal is applied to the gate of the driving MOS transistor, the source-gate voltage of the driving MOS transistor may be raised from the pre-bias Vgs to a voltage that generates a driving current. That is, the time taken to charge the gate capacitance of the driving MOS transistor to raise the potential from 0 at fresh condition of driving to the pre-bias Vgs becomes unnecessary. This can shorten the rising time.

In addition, since the driving MOS transistor is turned on/off via the resistor, it is possible to suppress the overshoot and undershoot of an output current owing to the presence of the low pass filter constituted by the gate capacitance of the driving MOS transistor and the resistor.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-019466, filed Jan. 29, 2010 and No. 2010-019463 filed Jan. 29, 2010, which are hereby incorporated by reference herein in their entirety.

What is claimed is:

1. A light emitting element driving circuit for driving a light emitting element in accordance with a differential data signal for causing the light emitting element to turn on or turn off, comprising:
   a first transistor;
   a first constant current source connected to a drain and gate of the first transistor and configured to supply a constant current through the drain and source of the first transistor;
   a second transistor configured to supply a current relative to the constant current to the light emitting element; and
   a control circuit configured to electrically connect or disconnect the gate of the first transistor to or from a gate of the second transistor via a first resistor in accordance with one of the differential data signals,
   wherein the control circuit includes a potential supply unit configured to supply, to the gate of the second transistor, an intermediate potential between a potential that completely turns on the second transistor and a potential that completely turns off the second transistor in accordance with the other of the differential data signals, while the gate of the first transistor is electrically disconnected from the gate of the second transistor.

2. The circuit according to claim 1, wherein the intermediate potential is closer to the potential that completely turns on the second transistor than to the potential that completely turns off the second transistor.

3. The circuit according to claim 1, wherein
   the control circuit includes a first switch transistor,
   wherein the one of the differential data signals is input to a gate of the first switch transistor, and
   the gate of the first transistor is electrically connected or disconnected to or from the gate of the second transistor via the first switch transistor and the first resistor.

4. The circuit according to claim 3, wherein the potential supply unit includes
   a second resistor and a second constant current source which are connected in series and have a connection point to supply the intermediate potential to the gate of the second transistor, and
   a second switch transistor to which gate the other of the differential data signals is input, and is configured to electrically connect or disconnect a power supply to or from one terminal of the second resistor and the second constant current source connected in series.

5. The circuit according to claim 3, wherein the potential supply unit includes
   a resistance circuit and a second constant current source connected in series and configured to supply the intermediate potential to the gate of the second transistor, and
   a second switch transistor to which gate the other of the differential data signals is input, and is configured to electrically connect or disconnect a power supply to or from one terminal of the resistance circuit and second constant current source connected in series, and
   the resistance circuit is a circuit with which a diode and two serially connected resistors are connected in parallel, and supplies the intermediate potential from a connection point of the two serially connected resistors.

6. The circuit according to claim 5, wherein the first transistor, the second transistor, the first switch transistor, and the second switch transistor are PMOS transistors,
   one terminal of the first constant current source is grounded, and the other terminal of the first constant current source is connected to the drain and gate of the first transistor,
   one terminal of the second constant current source is grounded, and the other terminal of the second constant current source is connected to one terminal of the second resistor or one terminal of the resistance circuit,
   a source and a back gate of the first transistor are connected to a power supply potential,
   the gate of the first switch transistor is connected to one of the differential data signals, a drain of the first switch transistor is connected to the gate and drain of the first transistor, and a source of the first switch transistor is connected to one terminal of the first resistor and one terminal of the second resistor or connected to one terminal of the first resistor and a connection point between two resistors in the resistance circuit,
   the gate of the second transistor is connected to the other terminal of the first resistor, the source and back gate of the second transistor are connected to a power supply potential, and a drain of the second transistor is connected to one terminal of the light emitting element, and
   the gate of the second switch transistor is connected to the other of the differential data signals, a drain of the second switch transistor is connected to the other terminal of the second resistor or the other terminal of the resistance circuit, and a source and back gate of the second switch transistor are connected to a power supply potential.

7. A light emitting element driving circuit for driving a light emitting element in accordance with a differential data signal for causing the light emitting element to turn on or turn off, comprising:
   a first transistor;
   a constant current source connected to a drain and gate of the first transistor and configured to supply a constant current through the drain and source of the first transistor;
   a second transistor configured to supply a current relative to the constant current to the light emitting element; and
   a control circuit configured to electrically connect or disconnect a gate of the first transistor to or from a gate of the second transistor via a resistor in accordance with the digital signal,
   wherein the control circuit includes a unit configured to shorten a rising time of a potential at the gate of the second transistor to increase a light emission pulse width of the light emitting element which is determined by a period during which the second transistor is ON.

8. The circuit according to claim 7, wherein the control circuit includes a first switch transistor configured to receive the digital signal at a gate and electrically connect or disconnect the gate of the first transistor to or from the gate of the second transistor via the resistor, and
   the unit configured to shorten the rising time of the control signal comprises a unit configured to set a potential at a back gate of the first switch transistor to a potential different from a ground potential.

9. The circuit according to claim 8, wherein the unit configured to set the potential at the back gate of the first switch transistor to a potential different from the ground potential comprises a variable voltage source connected between the back gate of the first switch transistor and the ground potential and configured to make a voltage be externally controlled.

10. The circuit according to claim 8, wherein the unit configured to set the potential of the back gate of the first switch transistor to a potential different from a ground potential comprises a unit configured to short-circuit the back gate of the first switch transistor to a drain of the first switch transistor.

11. The circuit according to claim 8, wherein the digital signal comprises a differential data signal in a digital form which is generated by a differential digital signal generating circuit in accordance with input of complementary digital signals, and one of the differential data signals in the digital form is input to the gate of the first transistor, and the control circuit further includes a second switch transistor to which gate the other of the differential data signals in the digital form is input and configured to connect or disconnect the gate of the second transistor to or from the ground potential via the resistor.

12. The circuit according to claim 11, wherein the first transistor, the second transistor, the first switch transistor, and the second switch transistor are MOS transistors, one terminal of the constant current source is grounded, and the other terminal of the first constant current source is connected to the drain and gate of the first transistor, the source and back gate of the first transistor are connected to the ground potential, the first switch transistor has a gate connected to one of the differential data signals in the digital form, a source connected to the gate of the first transistor, and a drain connected to one terminal of the resistor, the second transistor has a gate connected to the other terminal of the resistor, a source and back gate connected to the ground potential, and a drain connected to one terminal of the light emitting element, and the second switch transistor has a gate connected to the other of the differential data signals in the digital form, a drain connected to the drain of the first switch transistor, and a source and back gate connected to the ground potential.

* * * * *